(12) United States Patent  
Yamada

(10) Patent No.: US 11,848,035 B2  
(45) Date of Patent: Dec. 19, 2023

(54) FLEXURE OF DISK DRIVE SUSPENSION AND DISK DRIVE SUSPENSION

(71) Applicant: NHK SPRING CO., LTD., Yokohama (JP)

(72) Inventor: Yukie Yamada, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 17/987,672

(22) Filed: Nov. 15, 2022

(65) Prior Publication Data

US 2023/0154489 A1 May 18, 2023

(30) Foreign Application Priority Data

Nov. 16, 2021 (JP) ................. 2021-186538

(51) Int. Cl.  
*G11B 5/48* (2006.01)

(52) U.S. Cl.  
CPC ................. *G11B 5/4833* (2013.01)

(58) Field of Classification Search  
CPC ..... G11B 5/4833; G11B 5/484; G11B 5/4846; G11B 5/486  
See application file for complete search history.

(56) References Cited

U.S. PATENT DOCUMENTS

| | | | | |
|---|---|---|---|---|
| 7,710,687 B1* | 5/2010 | Carlson | ................ | G11B 5/4853 360/244.3 |
| 11,657,839 B2* | 5/2023 | Horiuchi | ................ | G11B 5/484 360/244.2 |
| 2010/0226045 A1* | 9/2010 | Yamada | ............... | G11B 5/4846 |
| 2010/0226047 A1* | 9/2010 | Arai | ..................... | G11B 5/4846 |
| 2012/0275065 A1* | 11/2012 | Yamada | ............... | G11B 5/4846 360/246.4 |
| 2013/0176645 A1* | 7/2013 | Arai | ...................... | G11B 5/486 360/245.8 |
| 2014/0168815 A1* | 6/2014 | Kudo | .................... | G11B 5/483 360/99.08 |
| 2014/0368954 A1* | 12/2014 | Inoue | ................... | G11B 5/4826 360/234.5 |
| 2017/0076745 A1* | 3/2017 | Kawao | .................. | G11B 5/486 |
| 2019/0066720 A1* | 2/2019 | Yamada | ............... | G11B 5/4833 |
| 2020/0258540 A1 | 8/2020 | Uehara | | |
| 2022/0076698 A1* | 3/2022 | Nesori | ................. | G11B 5/4873 |
| 2022/0406334 A1* | 12/2022 | Horiuchi | ................ | G11B 5/484 |
| 2023/0154489 A1* | 5/2023 | Yamada | ............... | G11B 33/022 360/240 |

FOREIGN PATENT DOCUMENTS

JP 2020129423 A 8/2020

* cited by examiner

*Primary Examiner* — Brian E Miller  
(74) *Attorney, Agent, or Firm* — Holtz, Holtz & Volek PC

(57) ABSTRACT

A flexure of a disk drive suspension includes a metal base, and a wiring portion provided along the metal base. The wiring portion includes a base insulating layer, a conductor layer overlapping with the base insulating layer, and a cover insulating layer overlapping with the conductor layer, and the metal base includes a pair of first portions having side surfaces opposed to each other. At least one of the base insulating layer and the cover insulating layer is in contact with the side surfaces between the pair of first portions, and the conductor layer does not overlap with the metal base in a direction of stacking the wiring portion.

8 Claims, 12 Drawing Sheets

Comparative Example

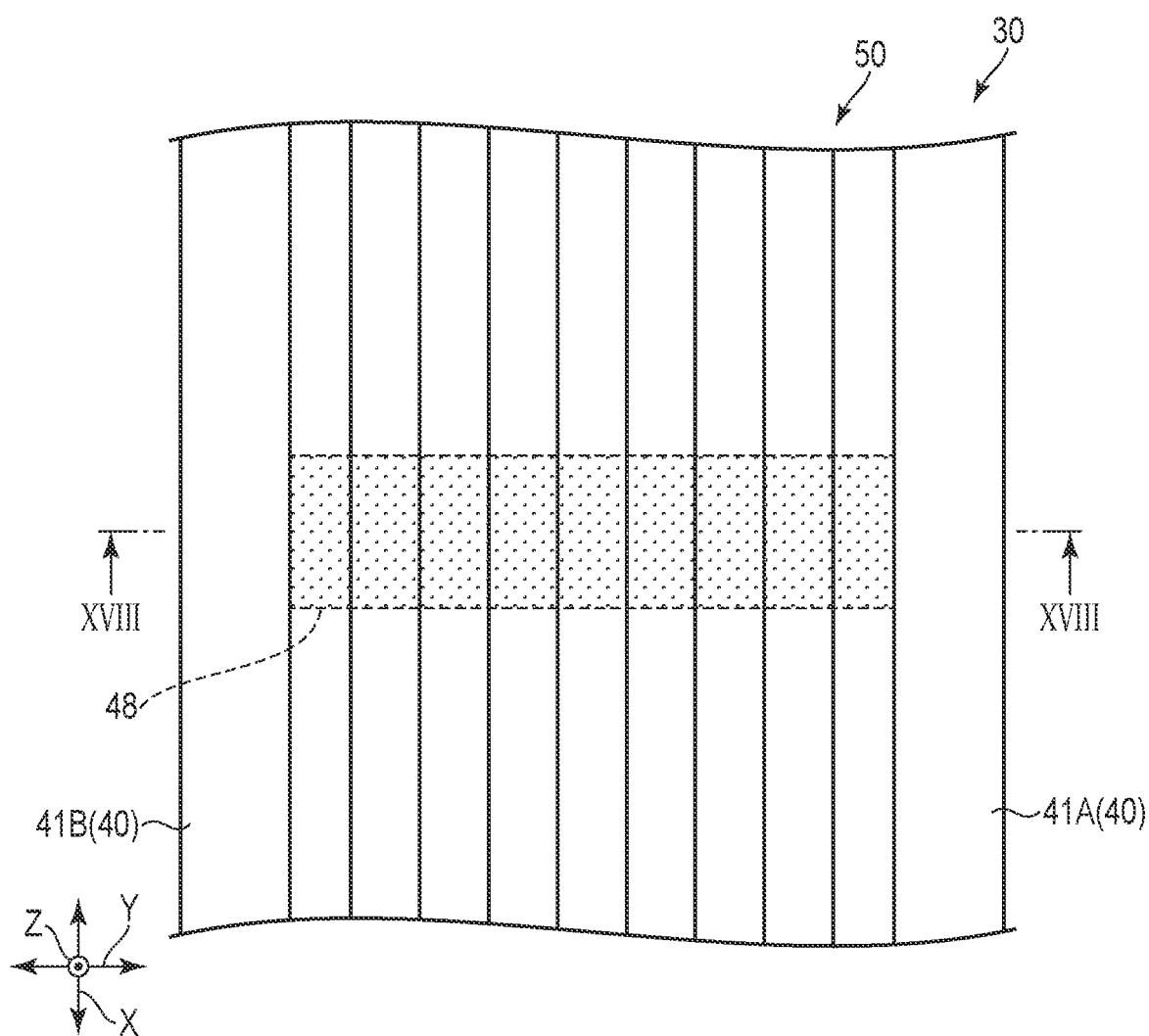
F I G. 17
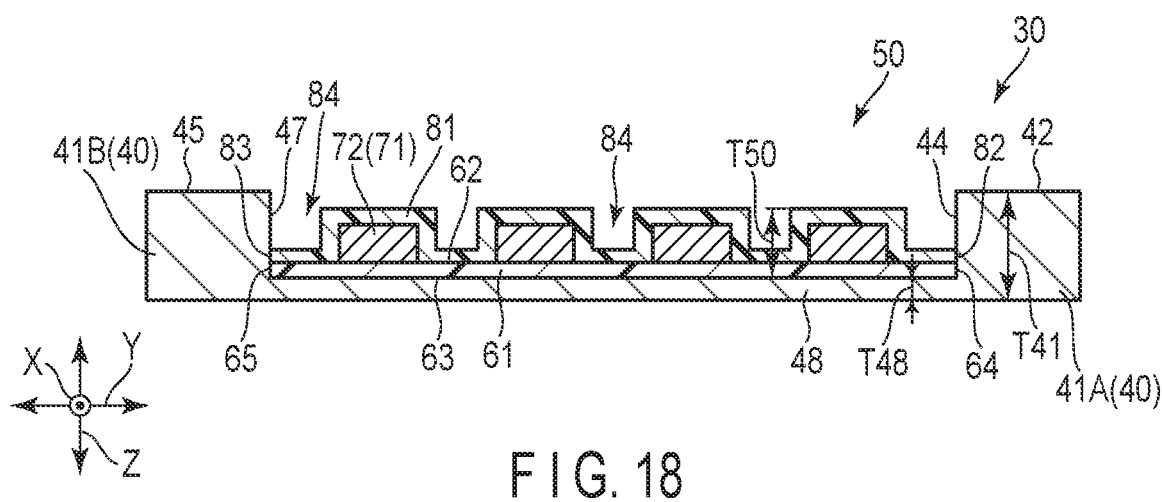
F I G. 18

FLEXURE OF DISK DRIVE SUSPENSION AND DISK DRIVE SUSPENSION

CROSS-REFERENCE TO RELATED APPLICATIONS

This application is based upon and claims the benefit of priority from prior Japanese Patent Application No. 2021-186538, filed Nov. 16, 2021, the entire contents of which are incorporated herein by reference.

BACKGROUND OF THE INVENTION

1. Field of the Invention

The present invention relates to a flexure of a disk drive suspension, and the disk drive suspension.

2. Description of the Related Art

A hard disk drive (HDD) is used in an information processing apparatus such as a personal computer. The hard disk drive comprises a magnetic disk that rotates about a spindle, a carriage that turns about a pivot, and the like. The carriage comprises an actuator arm, and turns about the pivot in a disk track width direction by a positioning motor such as a voice coil motor.

A disk drive suspension (hereafter referred to simply as a suspension) is attached to the actuator arm. The suspension includes a load beam, a flexure overlapping with the load beam, and the like. A slider, which constitutes a magnetic head, is provided on a gimbal portion formed near a distal end of the flexure.

The slider is provided with an element (transducer) for access such as reading or writing data. A head gimbal assembly is constituted by the load beam, the flexure, the slider, and the like.

In order to respond to higher recording densities of a disk, it is necessary to further miniaturize the head gimbal assembly and enable the slider to be positioned on a recording surface of the disk with even higher precision.

Due to the strong demand for increased recording capacity of the hard disk drive for increased recording density, an increase in the number of magnetic disks that the hard disk drive comprises (so-called multi-disking) has been promoted. For example, JP 2020-129423 A discloses a disk drive that enables the number of magnetic disks installed as recording media to be increased.

To increase the number of magnetic disks, it is necessary not only to make magnetic disks thinner, but also to make intervals between the magnetic disks smaller. If the intervals between the magnetic disks are made smaller, the risk that suspensions facing each other between the magnetic disks are brought into contact with each other may be increased. For this reason, thinning the suspensions is required.

However, there is still room for various improvements in the thinning of suspensions. For example, it is sometimes difficult to make load beams thinner, which largely affects the spring load, suspension resonance, and the like.

BRIEF SUMMARY OF THE INVENTION

The present invention aims to provide a flexure of a disk drive suspension that can be made thinner and the disk drive suspension.

According to an embodiment, a flexure of a disk drive suspension comprises a metal base, and a wiring portion provided along the metal base. The wiring portion includes a base insulating layer, a conductor layer overlapping with the base insulating layer, and a cover insulating layer over with the conductor layer, and the metal base includes a pair of first portions having side surfaces opposed to each other.

At least one of the base insulating layer and the cover insulating layer is in contact with the side surfaces between the pair of first portions, and the conductor layer does not overlap with the metal base in a direction of stacking the wiring portion.

The base insulating layer, the conductor layer, and the cover insulating layer are located between the side surfaces, and a thickness of the wiring portion may be less than or equal to a thickness of the pair of first portions. At least a part of the conductor layer may be buried in the base insulating layer.

The base insulating layer may be located between the side surfaces, and the conductor layer and the cover insulating layer may not be located between the side surfaces. The flexure further comprises an air layer, and the base insulating layer may be in contact with the air layer in between the side surfaces.

The flexure further comprises a support layer that supports the wiring portion and, in the stacking direction, the base insulating layer may have a first surface with which the conductor layer is in contact and a second surface opposed to the first surface, and the support layer may be in contact with the second surface.

The flexure further comprises a connection portion, and the conductor layer may include a plurality of lines arranged in a direction orthogonal to a direction of extension of the wiring portion, and the connection portion may be electrically connected to at least one of the plurality of lines.

According to of embodiment, a flexure of a disk drive suspension comprises a metal base, and a wiring portion provided along the metal base. The wiring portion includes a base insulating layer, a conductor layer overlapping with the base insulating layer, and a cover insulating layer overlapping with the conductor layer, and the metal base includes a pair of first portions having side surfaces opposed to each other and a second portion overlapping with the conductor layer and connected to the pair of first Portions.

At least one of the base insulating layer and the cover insulating layer is in contact with the side surfaces between the pair of first portions, and a thickness of the second portion is smaller than a thickness of the first portions. The second portion may include an opening overlapping with the conductor layer.

According to yet another embodiment, a disk drive, suspension comprises a load beam, and the flexure overlapping with the load beam.

According to this configuration, a flexure of a disk drive suspension that can be thinned and the disk drive suspension can be provided.

Additional objects and advantages of the invention will be set forth in the description which follows, and part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 17 is a schematic partial plan view showing a flexure according to an eleventh embodiment.

FIG. 18 is a schematic cross-sectional view showing a flexure taken along line XVIII-XVIII of FIG. 17.

DETAILED DESCRIPTION OF THE INVENTION

First Embodiment

Figure 1:
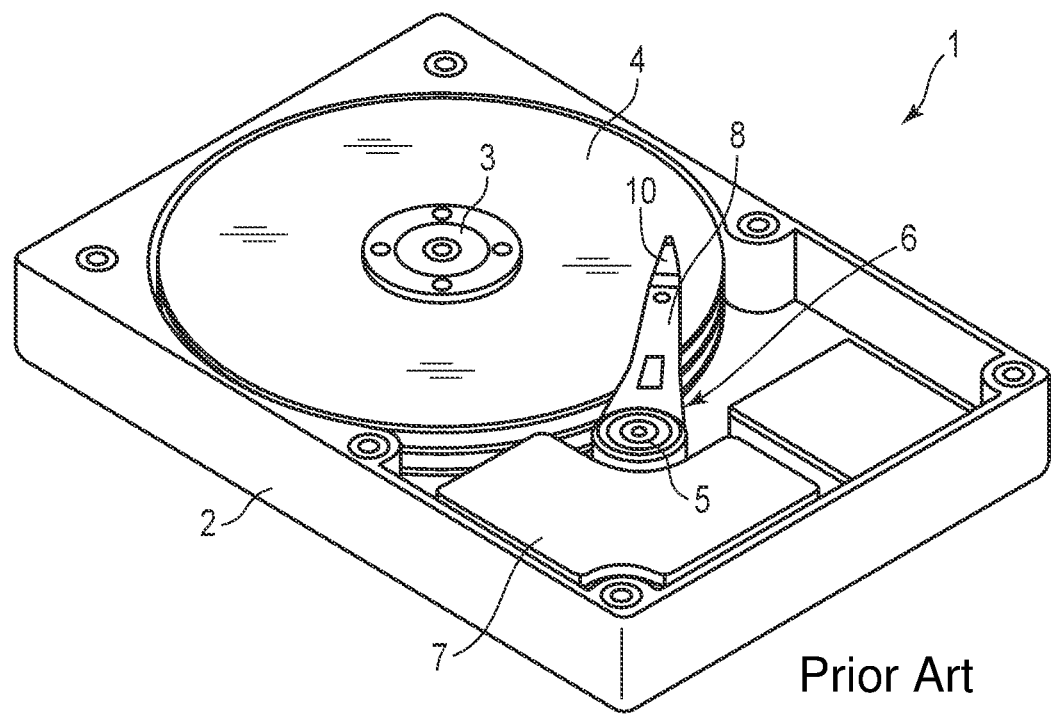
FIG. 1 is a schematic perspective view showing an example of a disk drive.

FIG. 1 is a schematic perspective view showing an example of a disk drive (HDD) 1. In the example shown in FIG. 1, the disk drive 1 comprises a casing 2, a plurality of magnetic disks (hereafter referred to simply as disks 4) rotating around a spindle 3, a carriage 6 that can turn around a pivot 5, and a positioning motor (voice coil motor) 7 for driving the carriage 6. The casing 2 is sealed by a lid (not shown).

Figure 2:
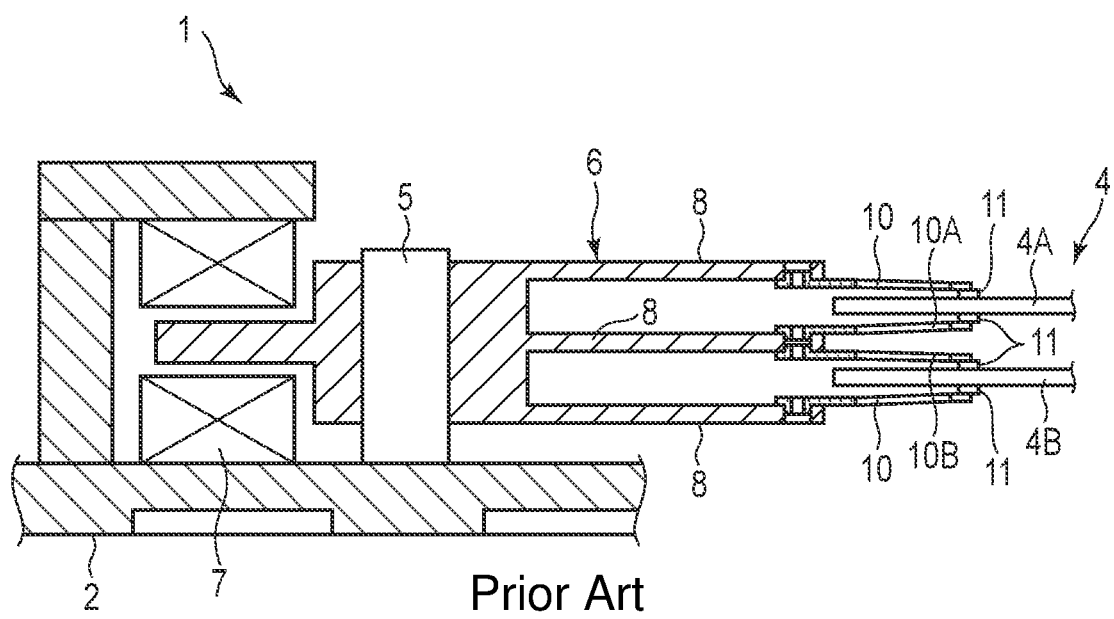
FIG. 2 is a schematic cross-sectional view showing a part of the disk drive.

FIG. 2 is a schematic cross-sectional view showing a part of the disk drive 1. As shown in FIG. 1 and FIG. 2, a plurality of arms (carriage arms) 8 are provided on the carriage 6. A suspension 10 is attached to each of distal end portions of the plurality of arms 8. A slider 11, which constitutes a magnetic head, is provided on each of the distal end portions of the suspensions 10.

When the disks 4 rotate at a high speed, air flows in between the disks 4 and the sliders 11, and air bearing is thereby formed. When the carriage 6 is turned by the positioning motor 7, the suspension 10 moves in the radial direction of the disk 4, and the slider 11 moves to a desired track of the disk 4.

As shown in FIG. 2, the disks 4 include a first disk 4A and a second disk 4B. The first disk 4A is opposed to the second disk 4B with a predetermined interval. A first suspension 10A and a second suspension 10B are included in the plurality of suspensions 10 provided on the risk drive 1.

The first suspension 10A and the second suspension 10B are located between the first disk 4A and the second disk 4B. The first suspension 10A is opposed to the second suspension 10B in a thickness direction of the casing 2. The plurality of disks 4 are not limited to two disks, but may be three or more disks. The quantity of suspensions 10 is arbitrarily changed according to the number of disks 4.

Figure 3:
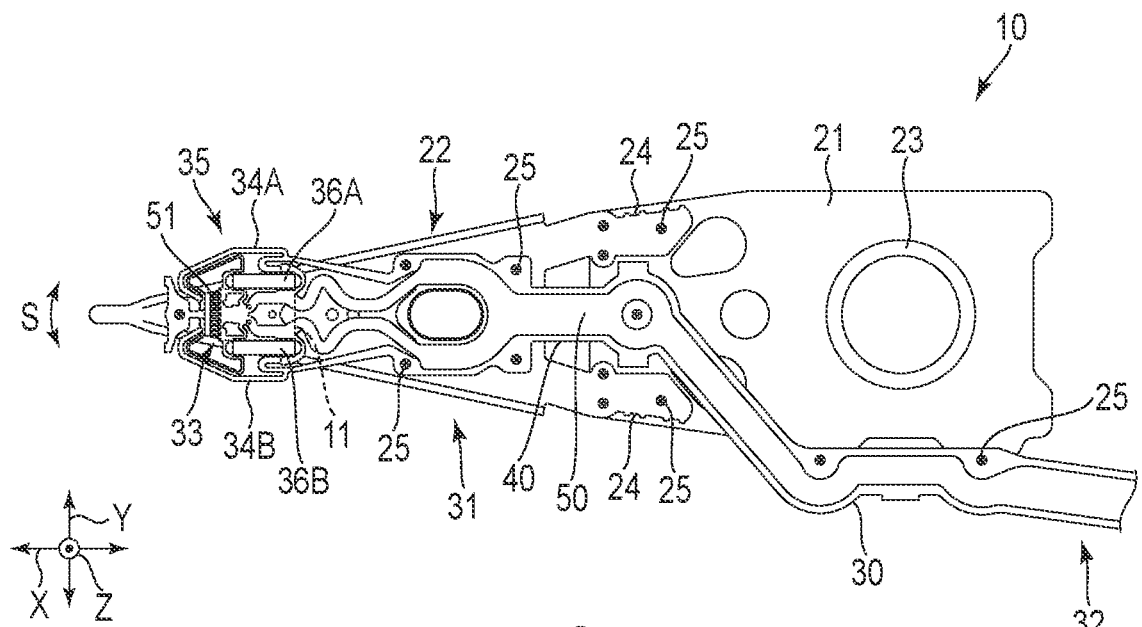
FIG. 3 is a schematic plan view showing a suspension according to a first embodiment.
Figure 4:
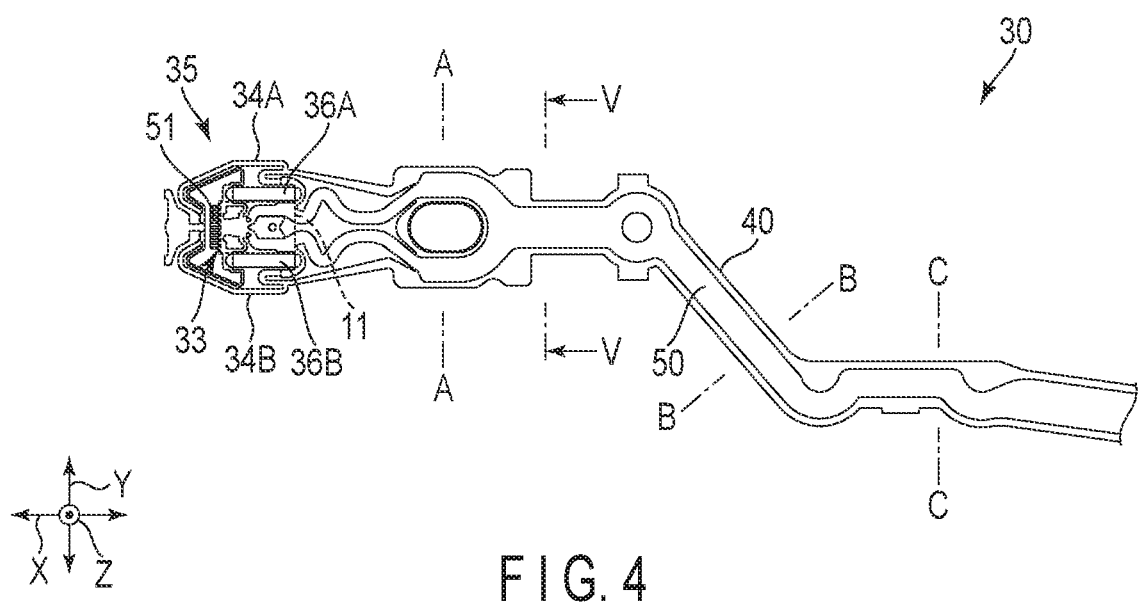
FIG. 4 is a schematic plan view showing a flexure shown in FIG. 3.

FIG. 3 is a schematic plan view showing the suspension 10 according to the first embodiment. FIG. 4 is a schematic plan view showing the flexure 30 shown in FIG. 3. The suspension 10 comprises a baseplate 21, a load beam 22, and a flexure 30.

Both the load beam 22 and the flexure 30 extend in the longitudinal direction of the suspension 10. In the following descriptions, the longitudinal direction of the suspension 10, the load beam 22, and the flexure 30 is defied as a longitudinal direction X, and a direction orthogonal to the longitudinal direction X is defined as a transverse direction Y of the suspension 10, the load beam 22, the flexure 30, and the like.

A direction intersecting (for example, orthogonal to) the longitudinal direction. X and the transverse direction Y is defined as a thickness direction Y of the suspension 10, the load beam 22, the flexure 30, and the like is defined as a thickness direction Z. Furthermore, a sway direction S is defined as indicated by an arc-shaped arrow near the distal end of the load beam 22.

The base plate 21 is formed of, for example, a metallic material such as stainless steel. The thickness of the baseplate 21 is, for example, 120 μm but is not limited to this example. A boss portion 23 for attaching the suspension 10 to the arm 8 (shown in FIG. 1 and FIG. 2) provided at the carriage 6 is provided at the baseplate 21.

The load beam 22 is formed of a metallic material such as stainless steel. A thickness of the load beam 22 is, for example, in a range of 30 to 80 μm. The load beam 22 has a shape tapered toward a distal end (left side of the figure).

The load beam 22 has a spring portion 24 at one of ends in the longitudinal direction X. The load beam 22 is fixed to the baseplate 21 by, for example, spot welding using a laser, at a weld portion 25. The load beam 22 is elastically supported by the base plate 21 via the spring portion 24.

The flexure 30 is arranged along the baseplate 21 and the load beam 22. The flexure 30 is fixed to the baseplate 21 and the load beam 22 by, for example, spot welding using a laser, at the weld portion 25.

The flexure 30 includes a distal side portion 31 (left side in the figure) that overlaps with the load beam 22, and a flexure tail 32 that extends from the baseplate 21 toward a rear side of the baseplate 21 (right side in the figure).

The flexure 30 comprises a metal base 40 formed of, for example, a thin stainless steel plate and a wiring portion 50 provided along the metal base 40. The flexure 30 has a stacked layer structure. The metal base 40 is often referred to as a stainless steel layer. A thickness of the metal base 40 is smaller than a thickness of the load beam 22.

At the distal side portion 31, the flexure 30 further includes a tongue 33 and a pair of outriggers 34A and 345. A slider 11 is mounted on the tongue 33. For example, an element capable of converting magnetic signals and electrical signals, such as an MR element, is provided at the distal end portion of the slider 11.

At the distal side portion 31, the wiring portion 50 is electrically connected to the element of the slider 11 via a terminal 51. These elements are used for access soon as writing data to or reading data from the disks or the like. A head gimbal assembly is constituted by the slider 11, the load beam 22, the flexure 30, and the like.

A pair of outriggers 341 and 345 are arranged on both sides of the tongue 33 in the transverse direction Y. The pair of outriggers 34A and 34B are shaped to protrude toward both outer sides of the tongue 33 in the transverse direction Y. The tongue 33 and the pair of outriggers 34A and 34B are parts of the metal base 40 and their outlines are formed by, for example, etching.

The gimbal portion 35 is composed of the tongue 33, the pair of outriggers 347 and 343, and the like. The gimbal portion 35 is formed at the distal side portion 31 of the flexure 30. Micro actuator elements 36A and 36B are mounted on the gimbal portion 35. The micro actuator elements 36A and 36B have a function of rotating the tongue 33 in the sway direction S.

The micro actuator elements 36A and 36B are arranged on both sides of the slider 11 in the transverse direction Y. The micro actuator elements 36A and 36B are formed of piezoelectric elements of lead zirconate titanate (PZT) or the like. The micro actuator elements 36A and 36B are fixed to actuator support portions of the tongue 33 by conductive adhesives or the like, respectively.

Figure 5:
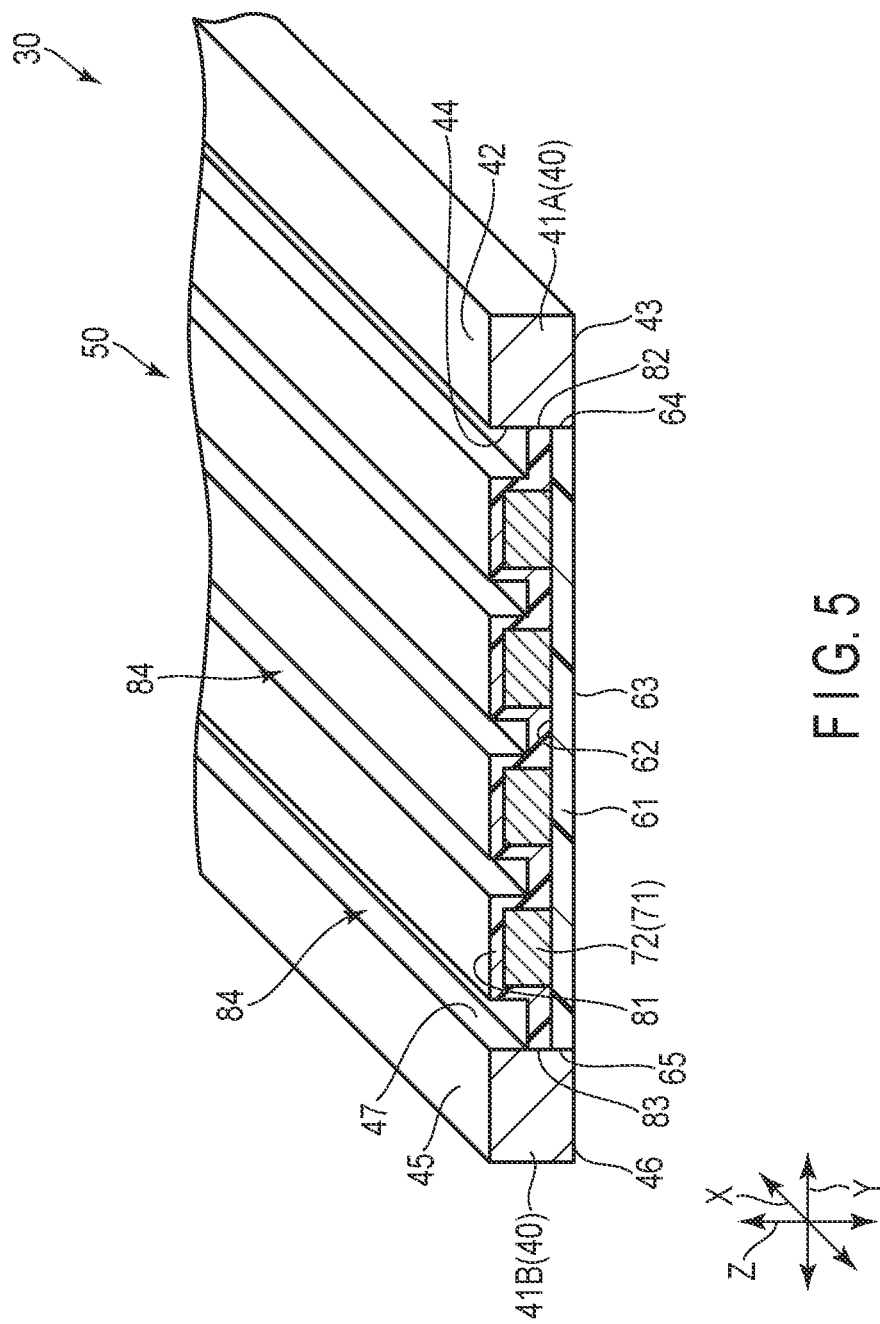
FIG. 5 is a schematic perspective cross-sectional view showing the flexure taken along line V-V in FIG. 4.
Figure 6:
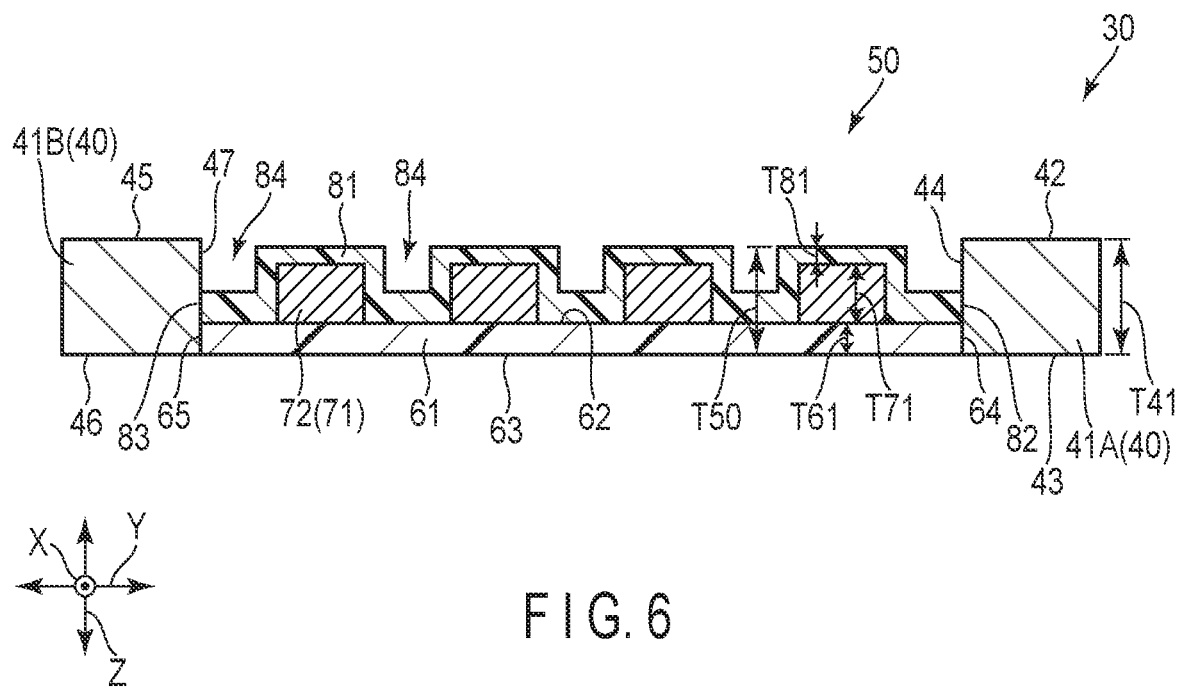
FIG. 6 is a schematic cross-sectional view showing the flexure shown in FIG. 5.

FIG. 5 is a schematic perspective cross-sectional view showing the flexure 30 taken along line V-V in FIG. 4. FIG. 6 is a schematic cross-sectional view showing the flexure 30 shown in FIG. 5. In FIG. 5 and FIG. 6, the cross section is viewed from the flexure tail 32 side.

The direction orthogonal to the extension direction of the wiring portion 50 may be hereinafter referred to as a "width direction of the wiring portion 50". The width direction of the wiring portion 50 is varied according to the position of the wiring portion 50 in the longitudinal direction X. For example, in the example shown in FIG. 5 and FIG. 6, the extension direction of the wiring portion 50 corresponds to the longitudinal direction X, and the width direction of the wiring portion 50 corresponds to the transverse direction Y.

As described above, the flexure 30 includes the metal base 40 and the wiring portion 50. As shown in FIG. 5 and FIG. 6, the metal base 40 includes a pair of first portions 41A and 41B.

The pair of first portions 41A and 41B are located on both sides of the flexure 30 in the transverse direction Y. A width in the transverse direction Y of the metal base 40 is larger than a width in the transverse direction Y of the wiring portion 50. From another viewpoint, the metal base 40 can be visually recognized in planar view of watching the suspension 10 from the flexure 30 side.

In the example shown in FIG. 5 and FIG. 6, the pair of first portions 41A and 41B are formed to have a rectangular cross section. The pair of first portions 41A and 41B may have a square cross section. The pair of first portions 41A and 41B may have a cross section including a curved surface. The sizes of the pair of first portions 41A and 41B are approximately equal.

The first portion 41A has a surface 42, a surface 43 opposite to the surface 42 in the thickness direction Z, and a side surface 44 that connects the surface 42 and the surface 43. The first portion 41B has a surface 45, a surface 46 opposite to the surface 45 in the thickness direction 5, and a side surface 47 that connects the surface 45 and the surface 46.

At the distal side portion 31, the surfaces 43 and 46 are, for example, surfaces opposed to the load beam 22 (shown in FIG. 3). In the thickness direction Z, the surface 42 is located in the same plane as the surface 45, and the surface 43 is located in the same plane as the surface 46.

In the transverse direction Y, the side surfaces 44 and 47 are opposed to each other. In the example shown in FIG. 5 and FIG. 6, the side surfaces 44 and 47 are, for example, surfaces substantially parallel to a plane defined by the longitudinal direction X and the thickness direction Z.

The wiring portion 50 includes a base insulating layer 61, a conductor layer 71 overlapping with the base insulating layer 61, and a cover insulating layer 81 overlapping with the conductor layer 71. The stacking direction of the wiring portion 50 is a direction along the thickness direction Z.

The base insulating layer 61 and the cover insulating layer 81 are formed of, for example, an electrically insulating resin material such as polyimide. In the example shown in FIG. 5 and FIG. 6, the base insulating layer 61 has a uniform thickness in the transverse direction Y.

The base insulating layer 61 has a surface 62 (first surface), and a surface 63 (second surface) opposite to the surface 62 in the thickness direction Z. The surface 62 is a surface with which the conductor layer 71 and cover insulating layer al are in contact. At the distal side portion 31, the surfaces 63 is, for example, a surface opposed to the load beam 22 (shown in FIG. 3).

In the example shown in FIG. 5 and FIG. 6, the surface 63 in the thickness direction Z is located in the same plane as the surfaces 43 and 46. The base insulating layer 61 further has an end surface 64 and an end surface 65 opposite to the end surface 64 in the transverse direction Y. The end surfaces 64 and 65 connect the surfaces 62 and 63.

The cover insulating layer 81 has an end surface 82, and an end surface 83 opposite to the end surface 82 in the transverse direction Y. In the thickness direction 3, the end surface 64 is located directly under the end surface 82, and the end surface 65 is located directly under the end surface 83.

The conductor layer 71 is formed of a metallic material with high conductivity, such as copper. The conductor layer 71 is formed to have a predetermined pattern along the base insulating layer 61 by etching. Another method may be to form the conductor layer 71 by, for example, a layer forming process such as plating on the base insulating layer 61 masked with a predetermined pattern.

As shown in FIG. 5 and FIG. 6, the conductor layer 71 includes a plurality of lines 72 arranged in the width direction of the wiring portion 50 (transverse direction Y in the example shown in FIG. 5 and FIG. 6). The plurality of lines 72 include, for example, read and write lines. The plurality of lines 72 are covered with the cover insulating layer 81.

The cover insulating layer 81 is, located in a region between the pair of first portions 41A and 41B and the conductor layer 71. The cover insulating layer 81 is located in regions between the plurality of 72. Each of the plurality of lines 72 is thereby insulated.

The cover insulating layer 31 does not overlap with the conductive layer 71 in the thickness direction Z, in the region between the pair of first portions 41A and 41B and the conductive layer 71, and the regions between the pair of lines 72. The cover insulating layer 81 is in contact with the surface 62 of the base insulating layer 61 in these regions.

A plurality of grooves 84 are formed in the cover insulating layer 81, in the region between the pair of first portions 41A and 41B and the conductor layer 71, and the regions between the plurality of lines 72. The plurality of grooves 84 are recessed toward the surface 62 and are formed along the conductor layer 71.

In the example shown in FIG. 5 and FIG. 6, the base insulating layer 61, the conductor layer 71, and the cover insulating layer 81 are located between the side surface 44 and the side surface 47 in the transverse direction Y. From another viewpoint, the wiring portion 50 is sandwiched between the side surface 44 and the side surface 47. In the thickness direction 2, the base insulating layer 61, the conductor layer 71, and the cover insulating layer 81 do not overlap with the pair of first portions 41A and 41B of the metal base 40.

At least one of the base insulating layer 61 and the cover insulating layer 81 is in contact with the side surfaces 44 and 47 between the pair of first portions 41A and 41B. In the example shown in FIG. 5 and FIG. 6, the base Insulating layer 61 and the cover insulating layer 81 are in contact with each of the side surfaces 44 and 47.

More specifically, the end surface 64 and end surface 82 are in contact with the side surface 44, and the end surface 65 and the end surface 83 are in contact with the side surface 47. From the other viewpoint, no gap is formed between the end surfaces 64 and 82 and the side surface 44, and no gap is formed between the end surfaces 65 and 83 and the side surface 47. Portions that are not in contact with the base insulating layer 61 and the cover insulating layer 81 are formed on the side surfaces 44 and 47.

As shown in FIG. 6, a thickness of the pair of first portions 41A and 41B is referred to as a thickness T41, a thickness of the wiring portion 50 is referred to as a thickness T50, a thickness of the base insulating layer 61 is referred to as a thickness T61, a thickness of the conductor layer 71 is referred to as a thickness T71, and a thickness of the cover insulating layer 81 is referred to as a thickness T81.

The thickness T41 of the pair of first portions 41A and 41B is approximately equal to a distance between the surfaces 42 and 45 and the surfaces 43 and 46 in the thickness direction Z. The thickness T50 of the wiring portion 50 is a thickness of a portion where the base insulating layer 61, the conductive layer 71, and the cover insulating layer 81 ail overlap in the thickness direction Z.

In the example shown in FIG. 6, the thickness 150 of the wiring portion 50 is a sum of the thickness T61 of the base insulating layer 61, the thickness T71 of the conductor layer 71, and the thickness T81 of the cover insulating layer 81.

The thickness T61 of the base insulating layer 61 is approximately equal to a distance between the surface 62 and the surface 63 in the thickness direction Z. The thickness T81 of the cover insulating layer 81 is, for example, a thickness in the region overlapping with the conductor layer 71. The thickness T81 of the cover insulating layer 81 is, for example, smaller than the thickness T61 of the base insulating layer 61.

The thickness T50 of the wiring portion 50 is, for example, less than or equal to the thickness T41 of the pair of first portions 41A and 41B (T50≤T41). In such a case, the thickness of the flexure 30 at the portion shown in FIG. 5 and FIG. 6 becomes approximately equal to the thickness T41 of the pair of first portions 41A and 41B.

In the example shown in FIG. 6, the thickness T50 of the wiring portion 50 is approximately equal to the thickness T41 of the pair of first portions 41A and 41B. The thickness 150 of the wiring portion 50 may be smaller than the thickness T41 of the pair of first portions 41A and 41B.

The thickness T41 of the first portions 41A and 41B is, for example, in a range from 11 to 50 μm. The thickness T41 of the pair of first portions 41A and 41B is, for example, 18 μm. The thickness T61 of the base insulating layer 61 is, for example, in a range from 5 to 20 μm. The thickness T61 of the base insulating layer 61 is, for example, 6 μm.

The thickness T81 of the cover insulating layer 81 is, for example, in a range from 2 to 10 μm. The thickness T81 of the cover insulating layer 81 is, for example, 2 μm. The thickness T71 of the conductor layer 71 is, for example, in a range from 4 to 16 μm. The thickness T71 of the conductor layer 71 is, for example, 10 μm.

In at least a part of the flexure 30 shown in FIG. 3 and FIG. 4, the metal base 40, the base insulating layer 61, the conductor layer 71, and the cover insulating layer 81 do not all overlap at the same time.

In the flexure 30, the example shown in FIG. 5 and FIG. 6 can be mainly applied to the range excluding, for example, a terminal of the wiring portion 50 provided on the flexure tail 32 side, the vicinity of the tongue 33, the portion where a point-to-point construction part is formed, the portion where a via portion is formed, and the like.

The point-to-point construction part is a part where the wiring portion 50 is not in contact with the metal base 40. For example, the point-to-point construction part is formed along the outriggers 34A and 34B. The via portion is, for example, a portion including a through hole which penetrates the base insulating layer 61.

The configuration of the flexure 30 in the first embodiment can be applied not only to the portion indicated by line V-V, but also to, for example, a range between the portion where the pair of outriggers 34A and 34B are formed and the flexure tail 32. The range includes the portions indicated by lines A-A, B-B, and C-C in FIG. 4, their vicinities, and the like.

As another example, the configuration of the flexure 30 can be applied to the flexure tail 32. As yet another example, the configuration of the flexure 30 may be applied to a range where the flexure 30 overlaps with the load beam 22. As yet another example, the configuration of the flexure 30 may be applied to a range where the flexure 30 does not overlap with the load beam 22.

As yet another example, the configuration of the flexure 30 may be applied to each of the range where the flexure 30 overlaps with the load beam 22 and the range where the flexure 30 does not overlap with the load beam 22. However, the range where the configuration of the flexure 30 can be applied changes depending on the shape of the suspension 10 and the like, and is not limited to the examples described above.

In the flexure 30 of the suspension 10 configured as described above, the conductor layer 71 does not overlap with the metal base 40 in the thickness direction least in part of the flexure 30, and the metal base 40, the base insulating layer 61, the conductor layer 71, and the cover insulation layer 81 do not all overlap at the same time.

The wiring portion 50 is provided or the metal base 40 such that at least one of the base insulating layer 61 and the cover insulating layer 81 is brought into contact with the side surfaces 44 and 47 between the pair of first portions 41A and 41B. Increase in the thickness of the flexure 30 can be suppressed and the flexure 30 can be made thinner by thus configuring the flexure 30.

Figure 7:
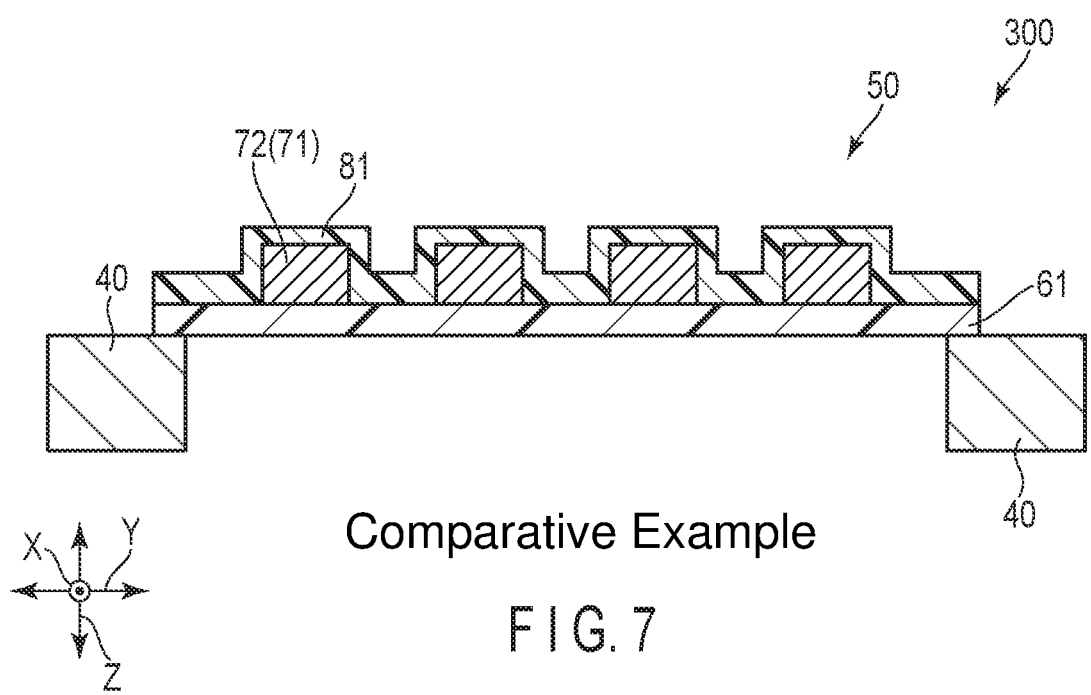
FIG. 7 is a view showing a comparative example of the flexure according to the first embodiment.

FIG. 7 shows a comparative example of the flexure 30 according to the first embodiment. In a flexure 300 shown in FIG. 7, the wiring portion 50 is provided on the metal base 40. The base insulating layer 61 is provided on the metal base 40, and the conductor layer 71 and the cover insulating layer 81 overlap with the base insulating layer 61.

In this case, a thickness of the flexure 300 is a sum of a thickness of the metal base 40 and a thickness of the wiring portion 50. The thickness of the flexure can be made smaller than the flexure 300 shown in FIG. 7, by configuring the flexure 30 as shown in FIG. 5 and FIG. 6.

The base insulating layer 61, the conductor layer 71, and the cover insulating layer 81 are located between the side surface 44 and the side surface 47 in the transverse direction Y. Furthermore, since the thickness of the flexure 30 does not become larger than the thickness T41 of the pair of first portions 41A and 41B by making the thickness T50 of the wiring portion 50 smaller than or equal to the thickness T41 of the pair of first portions 41A and 41B, increase in the thickness of the flexure 30 can be suppressed.

For example, when the thickness T50 of the wiring portion 50 is substantially equal to the thickness T41 of the pair of first portions 41A and 41B, the thickness of the flexure 30 can be made substantially equal to the thickness T41 of the pair of first portions 41A and 41B.

Furthermore, at least one of the base insulating layer 61 and the cover insulating is in contact with the side surfaces 44 and 47. At least one of the base insulating layer 61 and the cover insulating layer 81 supports the pair of first portions 41A and 41B in the transverse direction Y. The rigidity of the flexure 30 in the transverse direction Y can be thereby increased. The rigidity of the flexure 30 in the transverse direction Y may be referred to as "in-plane rigidity".

In the example shown in FIG. 5 and FIG. 6, the base insulating layer 61 and the cover insulating layer 81 are in contact with each of the side surfaces 44 and 47. For this reason, the rigidity of the flexure 30 in the transverse direction Y can be made larger than that in a case where either of the base insulating layer 61 or the cover insulating layer 81 is in contact with the side surfaces 44 and 47.

Furthermore, the in-plane rigidity can be maintained and the spring constant of the flexure 30 can be lowered in the flexure 30 of the first embodiment. A degree of freedom in designing of the vibration characteristics of the flexure 30 and the like can be thereby increased.

In accordance with the reduction of members stacked in the thickness direction Z and the reduction in thickness of the flexure 30, for example, the degree of freedom in designing of the thickness T61 of the base insulating layer 61 and the like can be increased in the wiring portion 50. For example, the transmission characteristics in the flexure 30, such as impedance matching, can easily be optimized by changing the thickness T61 of the base insulating layer 61.

Furthermore, the suspension 10 comprising the flexure 30 can be made thinner by making the flexure 30 thinner. Since such a suspension 10 can be applied to the disk drive 1 in which the distance between the disks 4 is made small, the disk drive 1 that can correspond to an increase in the number of disks 4 can be provided.

According to the embodiment, the flexure 30 of the suspension 10 that can be made thinner, and the suspension 10 can be provided. In addition to the above-described actions, various suitable actions can be obtained from the embodiment.

Next, the other embodiments will be described. In the other embodiments and modified examples described below, the same constituent elements as those in the first embodiment described above are denoted by the same reference numerals and their detailed descriptions may be omitted or simplified.

Second Embodiment

Figure 8:
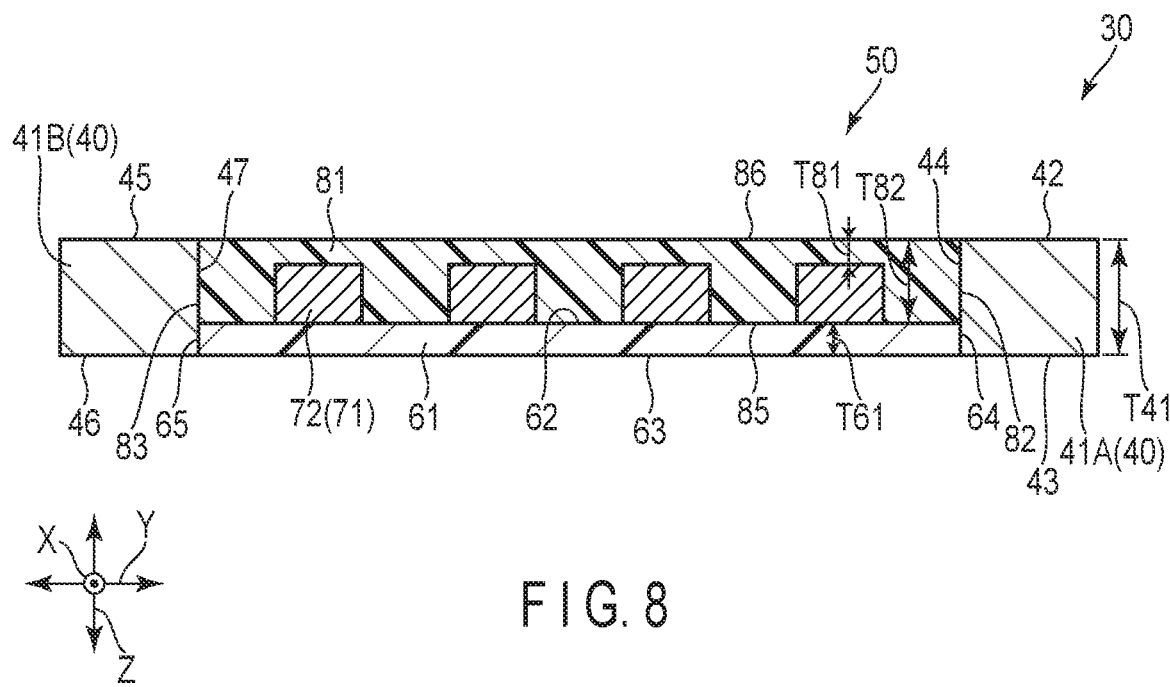
FIG. 8 is a schematic cross-sectional view showing a flexure according to a second embodiment.

FIG. 8 is a schematic cross-sectional view showing a flexure 30 according to a second embodiment. The flexure 30 of the second embodiment is different from the first embodiment in a wiring portion 50.

As shown in FIG. 8, the wiring portion 50 includes a base insulating layer 61, a conductor layer 71, and a cover insulating layer 81. The cover insulating layer 81 has a surface 85 opposed to a surface 62, and a surface 86 opposite to the surface 85 in the transverse direction Y. In the thickness direction Z, the surface 86 is located in the same plane as surfaces 42 and 45 of a pair of first portions 41A and 41B. A plurality of grooves 84 are formed in the cover insulating layer 81.

Entire bodies of side surfaces 44 and 47 are in contact with the base insulating layer 61 and the cover insulating layer 81. Portions that are not in contact with the base insulating layer 61 and the cover insulating layer 81 are not formed on the side surfaces 44 and 47, and an interval between the side surfaces 44 and 47 is filled with the base insulating layer 61 and the cover insulating layer 81. Each of an end surface 64 and an end surface 82 is in contact with the side surface 44, and each of an end surface 65 and an end surface 83 is in contact with the side surface 47.

A thickness T82 of the cover insulating layer 81 in a region between the pair of first portions 41A and 41B and a conductor layer 71 and a region between a plurality of lines 72 is larger than a thickness T81 of the cover insulating layer 81 in a region overlapping with the conductive layer 71.

In the region between the pair of first portions 41A and 41B and the conductor layer 71 and the region between the plurality of lines 72, a sum of a thickness T61 of the base insulating layer 61 and the thickness T82 of the cover insulating layer 81 is substantially equal to a thickness 141 of the pair of first portions 41A and 41B.

In the configuration of the flexure 30 of the second embodiment, too, the same effects as those of the first embodiment can be obtained. In the flexure 30 of the second embodiment, the interval between the side surface 44 and the side surface 47 is filled with the base insulating layer 61 and the cover insulating layer 81.

The base insulating layer 61 and the cover insulating layer 81 are in contact with entire bodies of the side surfaces 44 and 47. For this reason, the rigidity of the flexure 30 in the transverse direction Y can be further increased as compared to the first embodiment.

Third Embodiment

Figure 9:
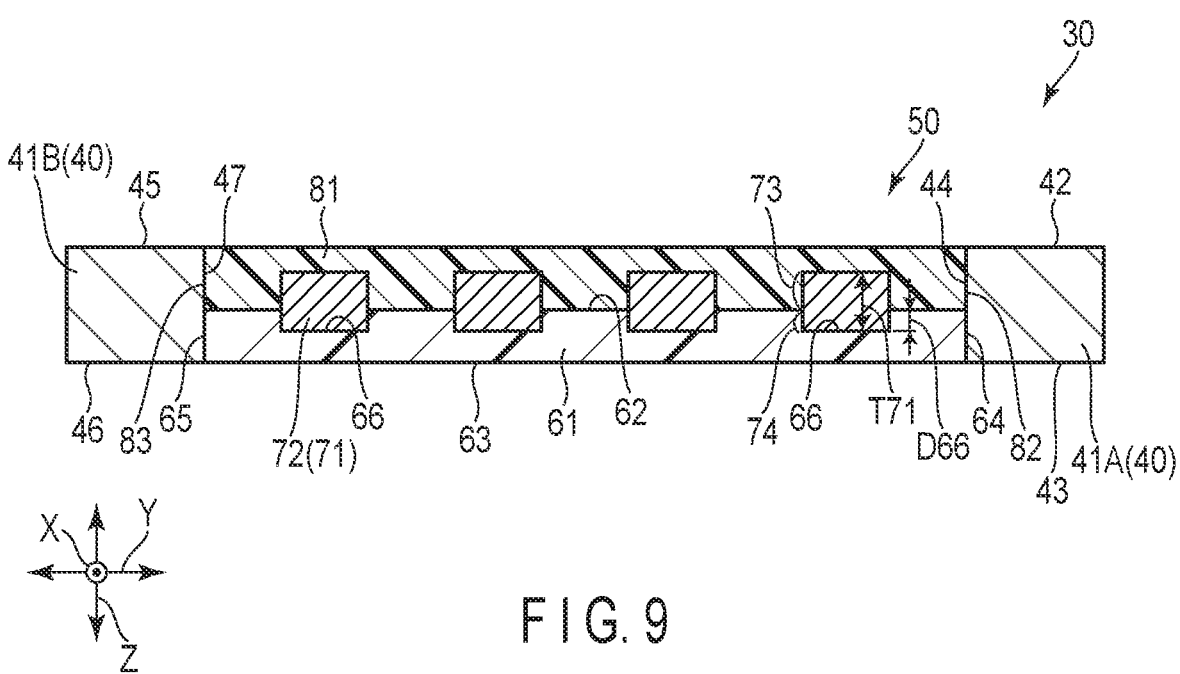
FIG. 9 is a schematic cross-sectional view showing a flexure according to a third embodiment.

FIG. 9 is a schematic cross-sectional view showing a flexure 30 according to a third embodiment. The flexure 30 of the third embodiment is different from each of the above-described embodiments in a wiring portion 50.

As shown in FIG. 9, a plurality of grooves 66 recessed from a surface 62 to a surface 63 are formed in a base insulating layer 61. A plurality of lines 72 overlap with the plurality of grooves 66, respectively. From another viewpoints, the plurality of lines 72 are formed along the plurality of grooves 66.

At least a part of a conductor layer 71 is buried in the base insulating layer 61. In the example shown in FIG. 9, a depth D66 of the grooves 66 is smaller than a thickness T71 of the conductor layer 71. For this reason, each of the plurality of lines 72 includes a portion 73 protruding above the groove 66 and a portion 74 buried in the groove 66, in the thickness direction Z. In the example shown in FIG. 9, the thickness of the protruding portion 73 is greater than the thickness of the buried portion 74.

In the configuration of the flexure 30 of the third embodiment, too, the same effects as those in each of the above-described embodiments can be obtained. In the flexure 30 of the third embodiment, since the plurality of lines 72 are buried in the plurality of grooves 66 in the base insulating layer 61, respectively, the plurality of lines 72 can hardly be moved in the transverse direction Y.

In the manufacturing process, positioning the conductor layer 71 can easily be performed. The thickness of the protruding portion 73 may be smaller than the thickness of the buried portion 74 or the thickness of the protruding portion 73 may be equal to the thickness of the buried portion 74.

Fourth Embodiment

Figure 10:
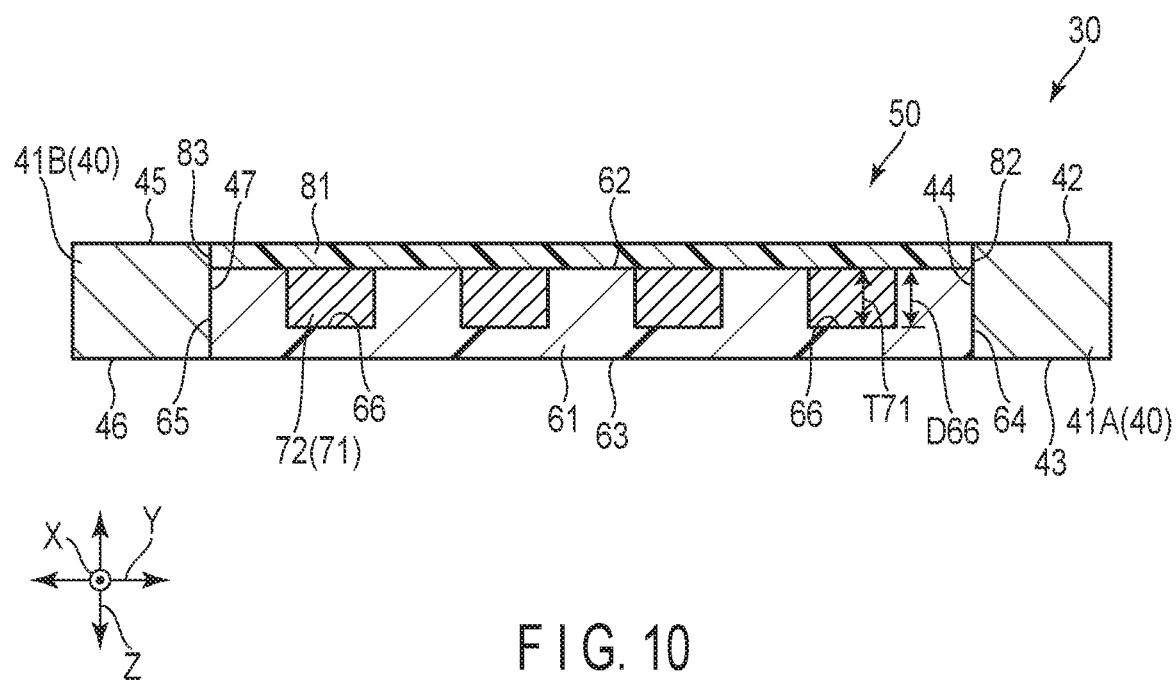
FIG. 10 is a schematic cross-sectional view showing a flexure according to a fourth embodiment.

FIG. 10 is a schematic cross-sectional view showing a flexure 30 according to a fourth embodiment. In the fourth embodiment, a depth D66 of grooves 66 is larger than that in the third embodiment.

In the example shown in FIG. 10, the depth D66 of the grooves 66 is substantially equal to a thickness T71 of a conductor layer 71. A plurality of lines 72 are buried in the plurality of grooves 66, respectively. The plurality of lines 72 do not include portions 73 protruding above the grooves 66 as compared with the example shown in FIG. 9. A cover insulating layer 81 has a uniform thickness in the transverse direction Y.

In the configuration of the flexure 30 of the fourth embodiment, too, the same effects as those in each of the above-described embodiments can be obtained. In the flexure 30 of the fourth embodiment, since the plurality of lines 72 are buried in the plurality of grooves 66 of the base insulating layer 61, respectively, the plurality of lines 72 can hardly be moved in the transverse direction Y. The depth D66 of the grooves 66 is larger than the thickness 171 of the conductor layer 71. In this case, the cover insulation layer 81 is partially buried in the grooves 66.

Fifth Embodiment

Figure 11:
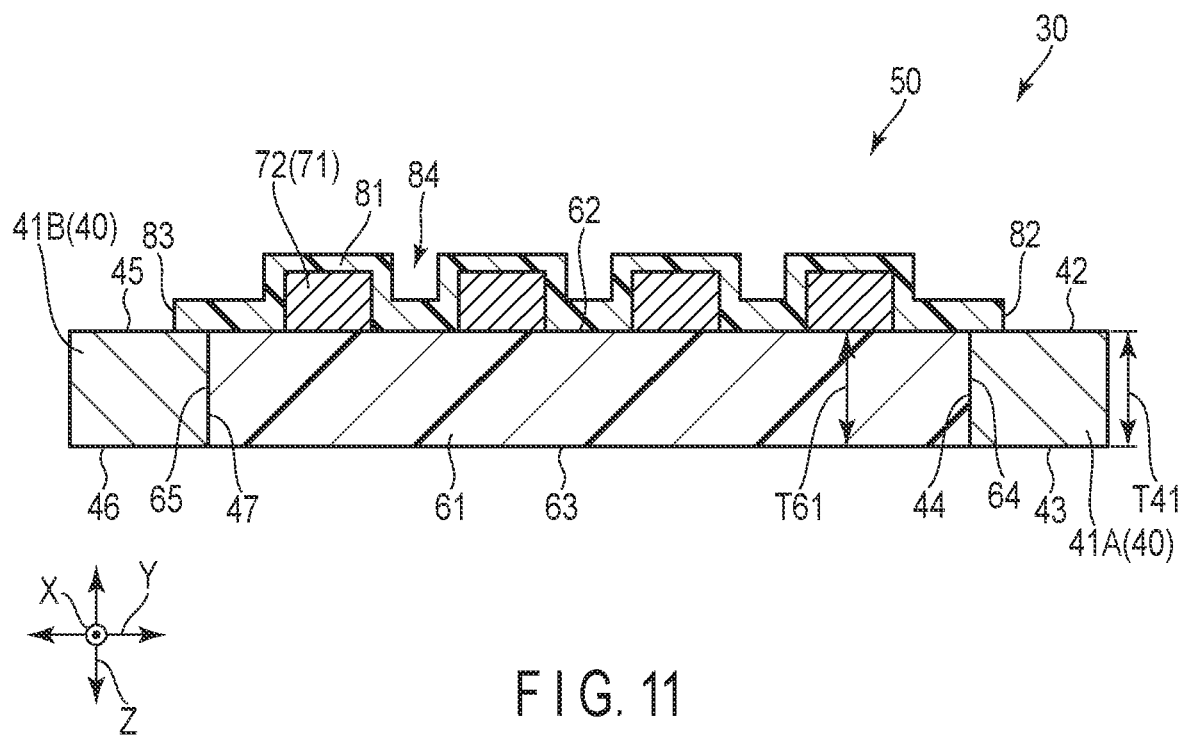
FIG. 11 is a schematic cross-sectional view showing a flexure according to a fifth embodiment.

FIG. 11 is a schematic cross-sectional view showing a flexure 30 according to a fifth embodiment. The flexure 30 of the fifth embodiment is different from each of the above-described embodiments in a wiring portion 50.

As shown in FIG. 11, a base insulating layer 61 is located between a side surface 44 and a side surface 47, while a conductor layer 71 and a cover insulating layer 81 are not located between the side surface 44 and the side surface 47, in the transverse direction Y.

A thickness T61 of a base insulating layer 61 is substantially equal to a thickness T41 of a pair of first portions 41A and 41B. In the thickness direction Z, a surface 62 of the base insulating layer 61 is located in the same plane as surfaces 42 and 45 of the pair of first portions 41A and 41B, and a surface 63 of the base insulating layer 61 is located in the same plane as surfaces 43 and 46 of the pair of first portions 41A and 41B.

An end surface 64 is in contact with the side surface 44, and an end face 65 is in contact with the side surface 47. Portions which are not in contact with the base insulating layer 61 are not formed on the side surfaces 44 and 47. End surfaces 82 and 83 are not in contact with the side surfaces 44 and 47.

The conductor layer 71 and the cover insulating layer 81 overlap with the surface 62. In the example shown in FIG. 11, the cover insulating layer 81 partially overlaps with surfaces 42 and 45 of the pair of first portions 41A and 41B.

A width of the cover insulating layer 81 is larger than a width of the base insulating layer 61 in the transverse direction Y. From another viewpoint, the end surfaces 82 and 83 are farther from the conductor layer 71 than the side surfaces 44 and 47 (end surfaces 64 and 65) in the transverse direction.

In the configuration of Id flexure 30 of the fifth embodiment, too, the same effects as those in each of the above-described embodiments can be obtained. In the flexure 30 of the fifth embodiment, the base insulating layer 61 is located between the side surface 44 and the side surface 47. For this reason, the thickness of the flexure 30 can be reduced by the amount corresponding to the thickness T61 of the base insulating layer 61.

Furthermore, a process of reducing the thickness T61 of the base insulating layer 61 can be reduced in the manufacturing process, by making the thickness of the base insulating layer 61 the same as the thickness T41 of the pair of first portions 41A and 41B. The width of the cover insulating layer 81 may be smaller than the width of the base insulating layer 61, and the width of the cover insulating layer 81 may be equal to the width of the base insulating layer 61, in the short direction Y.

Sixth Embodiment

Figure 12:
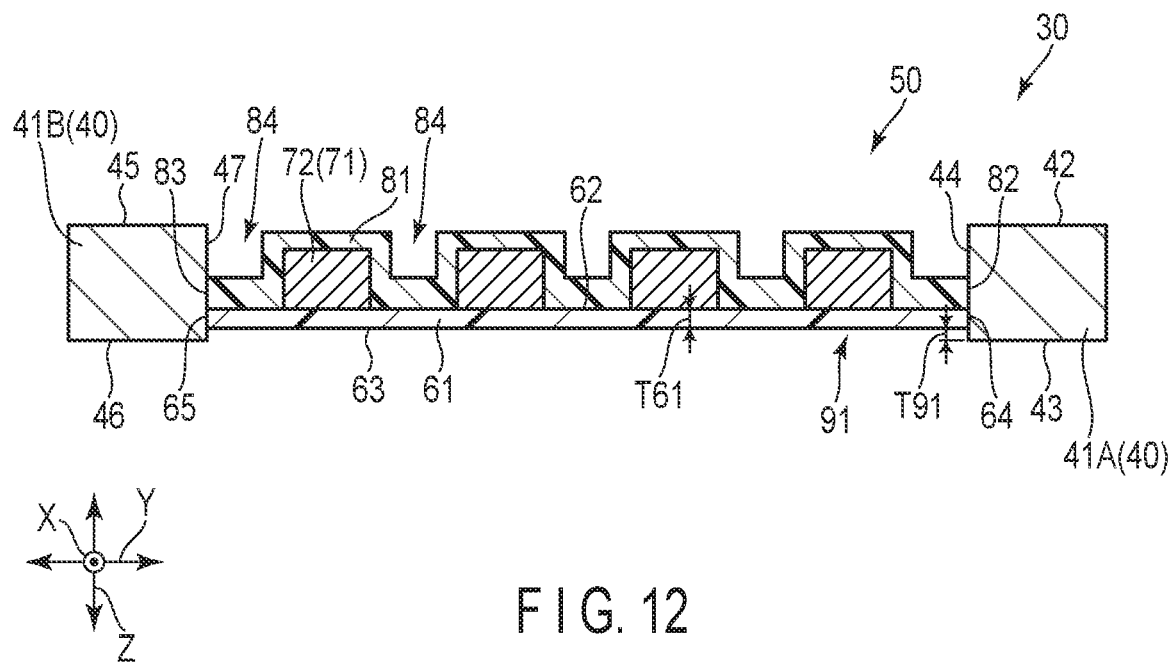
FIG. 12 is a schematic cross-sectional view showing a flexure according to a sixth embodiment.

FIG. 12 is a schematic cross-sectional view showing a flexure 30 according to a sixth embodiment. The flexure 30 of the sixth embodiment is different from each of the above-described embodiments in a wiring portion 50.

The flexure 30 further comprises an air layer 91 that is in contact with a surface 63 of a base insulation layer 61. A surface 63 of the base insulating layer 61 is in contact with the air layer 91 between a side surface 44 and a side surface 47. A conductor layer 71 overlaps with the air layer 91.

As shown in FIG. 12, the surface 63 of the base insulating layer 61 is separated from surfaces 43 and 46 of the pair of first portions 41A and 41B in the thickness direction Z. From another viewpoint, the surface 63 of the base insulating layer 61 is not located in the same plane as surfaces 42 and 45 and the surfaces 43 and 46 of the pair of first portions 41A and 41B.

A thickness T61 of the base insulating layer 61 is smaller than a thickness T61 of the base insulating layer 61 shown in FIG. 6. For example, the base insulating layer. 61 shown in FIG. 12 is formed by over-etching a backup layer to be described later, when removed in an etching process.

When the flexure 30 overlaps with the load beam 22, the air layer 91 is located just above the load beam 22. A thickness T91 of the air layer 91 can be arbitrarily changed by changing the thickness T61 of the base insulating layer 61.

In the configuration of the flexure 30 of the sixth embodiment, too, the same effects as those in each of the above-described embodiments can be obtained. In the flexure 30 of the sixth embodiment, the air layer 91 of the flexure 30 overlaps to be opposed to the load beam 22 when a suspension 10 is formed.

For this reason, the range of adjustment of the dielectric constant in the flexure 30 is widened by providing the air layer 91, and the degree of freedom in designing the flexure 30 can be widened for optimizing the transmission characteristics.

The air layer 91 is formed entirely between the side surfaces 44 and 47 in the transverse direction Y, but the air layer 91 may be partially formed between the side surfaces 44 and 47 in the transverse direction Y. The air layer 91 is formed with a uniform thickness in the transverse direction Y, but the thickness of the air layer 91 may be changed arbitrarily in the transverse direction.

Seventh Embodiment

Figure 13:
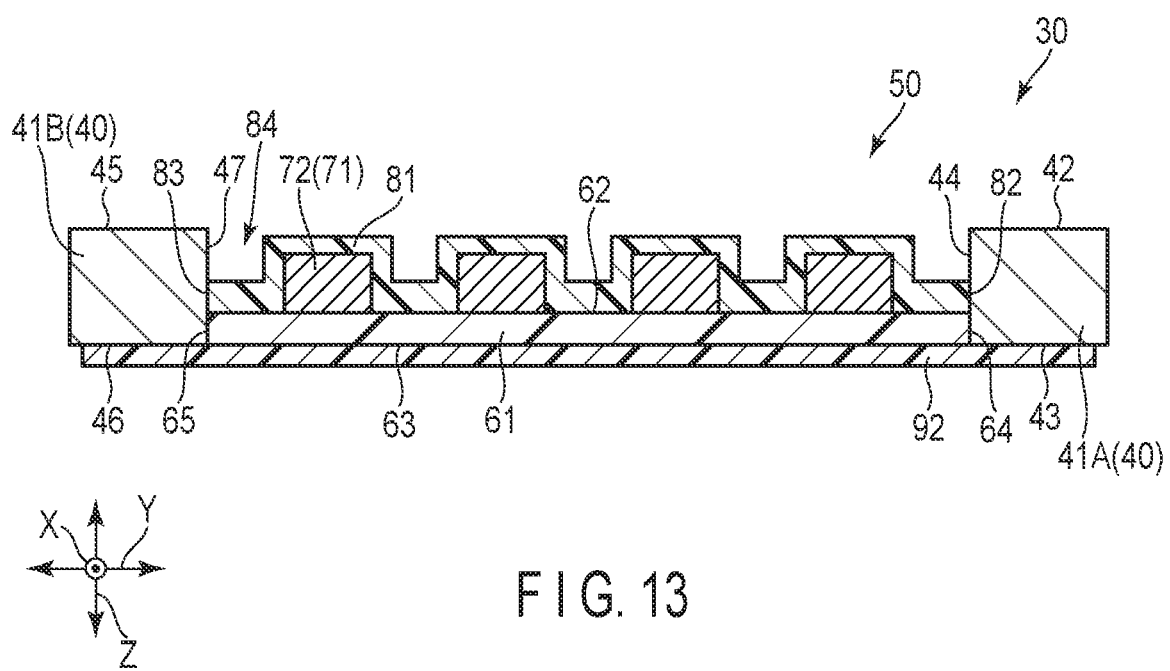
FIG. 13 is a schematic cross-sectional view showing a flexure according to a seventh embodiment.

FIG. 13 as a schematic cross-sectional view showing a flexure 30 according to a seventh embodiment. The flexure 30 of the seventh embodiment is different from each of the above-described embodiments in comprising a support layer 92.

As shown in FIG. 13, the flexure 30 further comprises a support layer 92 which supports a wiring portion 50. The support layer 92 is, for example, a backup layer used in a manufacturing process of the flexure 30.

A pair of first portions 41A and 41B and the wiring portion 50 overlap with the support layer 92. More specifically, the support layer 92 is in contact with surfaces 43 and 46 of the pair of first portions 41A and 41B and a surface 63 of a base insulating layer 61.

The support layer 92 is formed of, for example, an electrically insulating resin material such as polyimide. In the example shown in FIG. 13, the support layer 92 has a uniform thickness in the transverse direction Y. For example, the thickness of the support layer 92 is smaller than a thickness of the base insulating layer 61.

In the configuration of the flexure 30 of the seventh embodiment, too, the same effects as those in each of the above-described embodiments can be obtained. In the flexure 30 of the seventh embodiment, the case insulating layer 61, a conductor layer 71, and a cover insulating layer 81 are located between a side surface 44 and a side surface 47 in the transverse direction Y. For this reason, even when the flexure 30 comprises the support layer 92, increase in thickness of the flexure 30 can be suppressed.

Increase in the thickness of the flexure 30 can be suppressed by reducing the thickness of the support layer 32. Furthermore, by providing the support layer 92 formed of an electrically insulating resin material, insulation from the load beam 22 can easily be executed when forming the suspension 10. In this case, for example, the flexure 30 is fixed to the load beam 22 by means of an adhesive.

Furthermore, in the manufacturing process, the number of processes can be reduced since a process for removing the support layer 92 is unnecessary. In the example shown in FIG. 13, the support layer 92 overlaps with the wiring portion 50 and the pair of first portions 41A and 41B, but the support layer 92 may overlap with only the wiring portion 50.

Eighth Embodiment

Figure 14:
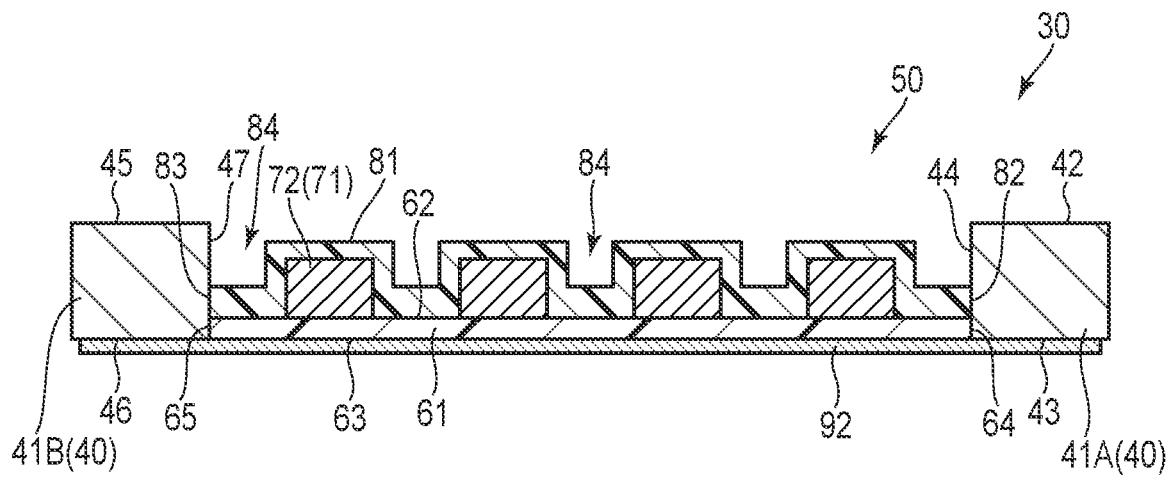
FIG. 14 is a schematic cross-sectional view showing a flexure according to an eighth embodiment.

FIG. 14 is a schematic cross-sectional view showing a flexure 30 according to an eighth embodiment. The eighth embodiment is different from the seventh embodiment in a support layer 92 provided at the flexure 30. In the example shown in FIG. 14, the support layer 92 is formed of, for example, a metallic material such as copper. The support layer 92 is formed by, for example, a method such as plating or sputtering.

In the configuration of the flexure 30 of the eighth embodiment, too, the same effects as those of the above-described embodiments can be obtained. In the flexure 30 of the eighth embodiment, the support layer 92 can be made to act as a ground layer of a conductor layer 71 by forming the support layer 92 of a metallic material. The electrical characteristics in the flexure 30 can be improved by providing a highly conductive ground layer near the conductor layer 71.

In the example shown in FIG. 14, the support layer 92 overlaps with each of the wiring portion 50 and the pair of first portions 41A and 41B, but the support layer 92 may overlap with only the wiring portion 50.

Ninth Embodiment

Figure 15:
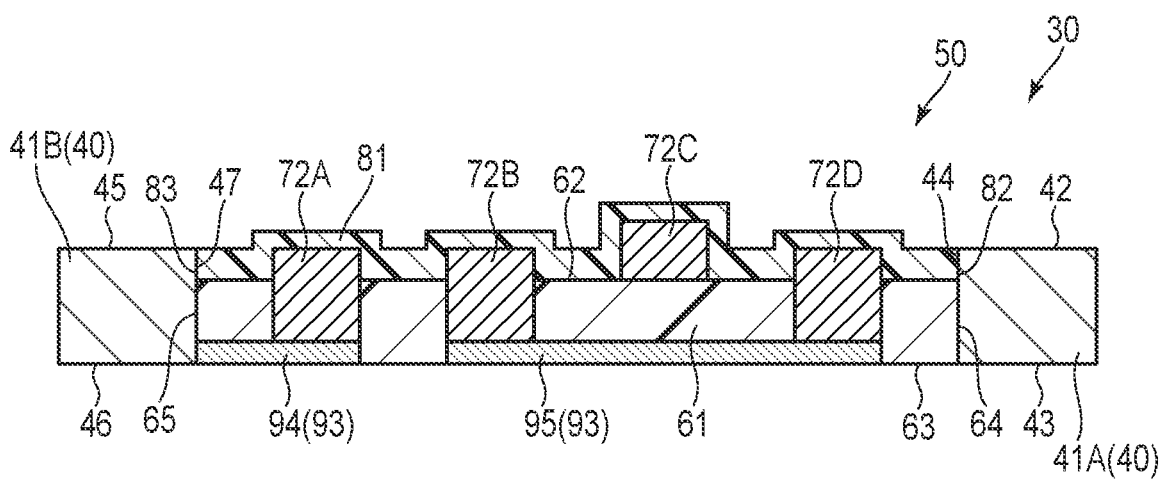
FIG. 15 is a schematic cross-sectional view showing a flexure according to a ninth embodiment.

FIG. 15 is a schematic cross-sectional view showing a flexure 30 according to a ninth embodiment. The flexure 30 of the ninth embodiment is different from each of the above-described embodiments in comprising a connection portion 93.

As shown in FIG. 15, the flexure 30 further comprises the connection portion 93. The connection portion 93 is formed of, for example, a metallic material such as copper. The connection portion 93 is formed by, for example, a method such as plating or sputtering. In the transverse direction Y, for example, the connection portion 93 is located between a side surface 44 and a side surface 47. The connection portion 93 does not overlap with, for example, a pair of first portions 41A and 41B.

The connection portion 93 is electrically connected to at least one of the plurality of lines 72. The connection portion 93 includes a connect portion 94 and a connection portion 95. The plurality of lines 72 include lines 72A to 72D.

The connection portion 94 electrically connects the first portion 41B with the line 72A. The connection portion 94 is connected to, for example, the side surface 47 of the first portion 41S. The connection portion 95 electrically connects the line 72B with the line 72D.

The line 72C that is not connected to the connection portion 95 is located between the line 72B and the line 72D. Since a base insulating layer 61 is located between the connection portion 94 and the connection portion 95, the connection portion 94 is insulated from the connection portion 95.

In the example shown in FIG. 15, the lines 72A, 72B, and 72D are buried in the base insulating layer 61, but the line 72C is not buried in the base insulating layer 61. A thickness of the lines 72A, 72B, and 72D is larger than, for example, a thickness of the line 72C. By thus providing the line 72C, the line 72C can be insulated from the connection portion 95, and the line 72B and the line 72D can be electrically connected to each other by the connection portion 95.

In the configuration of the flexure 30 of the ninth embodiment, too, the same effects as those in each of the above-described embodiments can be obtained. In the flexure 30 of the ninth embodiment, increase in the thickness of the flexure 30 can be suppressed since the connection portion 93 is located between the side surface 44 and the side surface 47 in the transverse direction Y.

The connection portion 93 can be used to ground the conductor layer 71 to the metal base 40 or can be used as a jumper to connect the plurality of lines 72. The electrical characteristics in the flexure 30 can be thereby improved.

The shape of the connection portion 93 is not limited to the above-described example. Either the connection portion 94 used to ground the conductor layer 71 or the connection 95 used as a jumper to connect the plurality of lines 72 to each other may be provided at the connection portion 93. The connection between the plurality of lines can be modified arbitrarily.

Tenth Embodiment

Figure 16:
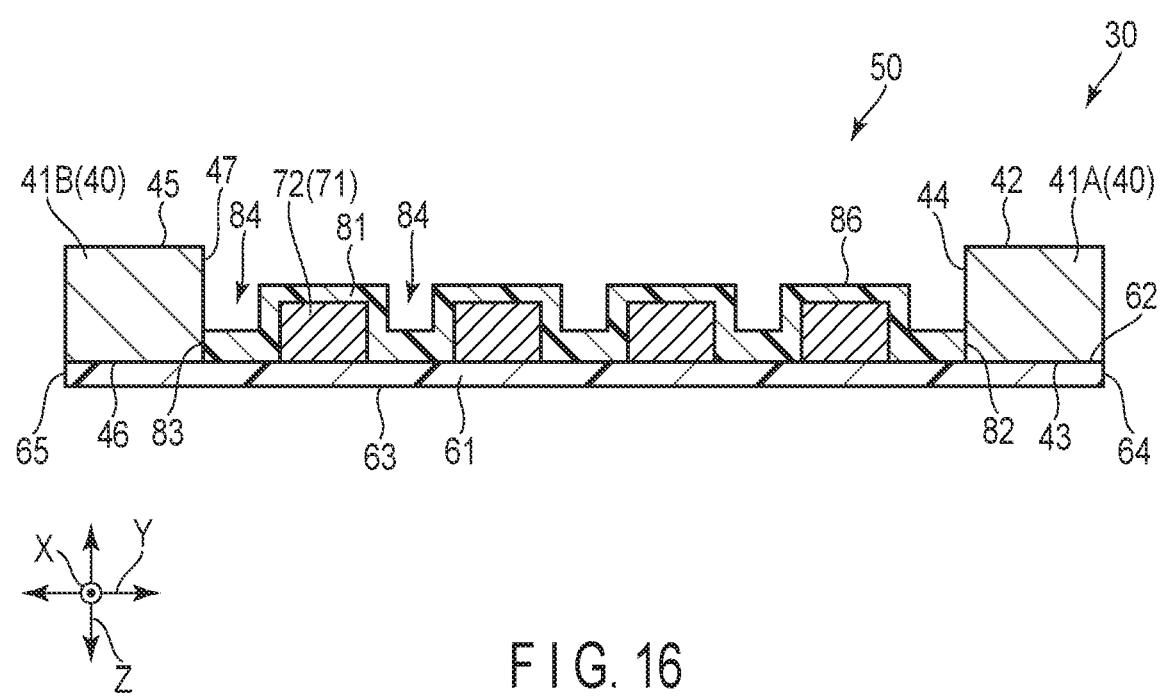
FIG. 16 is a schematic cross-sectional view showing a flexure accord to a tenth embodiment.

FIG. 16 is a schematic cross-sectional view showing a flexure 30 according to a tenth embodiment. The flexure 30 of the tenth embodiment is different from each of the above-described embodiments in a wiring portion 50.

As shown in FIG. 16, a pair of first portions 41A and 41B overlap with a base insulating layer 61. More specifically, the pair of first portions 41A and 41B are in contact with a surface 62 of the base insulating layer 61. From another viewpoint, the base insulating layer 61 is not located between a side surface 44 and a side surface 47 in the transverse direction Y.

A conductor layer 71 and a cover insulating layer 81 are located between the side surface 44 and the side surface 47 in the transverse direction Y. End surfaces 82 and 83 of a cover insulating layer 81 are in contact with the side surfaces 44 and 47, respectively. Portions that are not in contact with the cover insulating layer 81 are formed on the side surfaces 44 and 47.

In the configuration of the flexure 30 of the tenth embodiment, too, the same effects as those in each of the above-described embodiments can be obtained. In the flexure 30 of the tenth embodiment, the base insulating layer 61 is not located between the side surface 44 and the side surface 47.

For this reason, in the example shown in FIG. 16, the conductor layer 71 and the cover insulating layer 81 can be more separated from surfaces 42 and 45 of the pair of first portions 41A and 41B in the thickness direction Z than in the example shown in FIG. 6.

In the flexure 30 of the tenth embodiment, the conductor layer 71 can be separated not only from the metal base 40 but also from a load beam 22 by making the surfaces 42 and 45 of the pair of first portions 41A and 41B overlap with the load beam 22 so as to be opposed to the load beam 22 when a suspension 10 is formed.

Differences in electrical characteristics from a point-to-point construction portion and the like, which occur in the flexure 30, can be thereby made small. The support layer 92 described with reference to FIG. 13 may be applied to the base insulating layer 61 of the flexure 30 of the tenth embodiment.

Eleventh Embodiment

FIG. 17 is a schematic partial plan view showing a flexure 30 according to an eleventh embodiment. FIG. 18 is a schematic cross-sectional view showing the flexure 30 taken along line XVIII-XVIII of FIG. 17. FIG. 17 shows the flexure 30 viewed from a cover insulating layer 81 side. The flexure 30 of the eleventh embodiment is different from each of the above-described embodiments in a metal base 40.

As shown in FIG. 17 and FIG. 18, the metal base 40 further includes a second portion 48 connected to a pair of first portions 41A and 41B. The second portion 48 functions as a "furring" that connects the pair of first portions 41A and 41B.

In FIG. 17, an area where the second portion 48 is formed is marked with dots. As shown in FIG. 17, the second portion 48 is formed on a part of the metal base 40 along the longitudinal direction X. A range in which the second portion 48 is formed can be changed arbitrarily.

As shown in FIG. 18, the second portion 48 is connected to each of side surfaces 44 and 47 in the short direction Y. For example, the second portion 48 is formed integrally with the pair of first portions 41A and 41B.

The second portion 48 is formed by, for example, half-etching a portion of the metal base 40, which corresponds to the second portion 48, in an etching process when, for example, forming the metal base 40. The second portion 48 has a uniform thickness in the transverse direction Y.

A thickness T48 of the second portion 48 is smaller than a thickness T41 of the pair of first portions 41A and 41B. A thickness T48 of the second portion 48 is, for example, smaller than or equal to a half of a thickness T41 of the pair of first portions 41A and 41B. As yet another example, the thickness T48 of the second portion 48 is smaller than or equal to a quarter of the thickness T41 of the pair of first portions 41A and 41B.

The second portion 48 overlaps with a base insulating layer 61, a conductor layer 71, and a cover insulating layer 81, in the thickness direction 2. The base insulating layer 61 and the cover insulating layer 81 are in contact with each of the side surfaces 44 and 47.

In the example shown in FIG. 18, the base insulating layer 61, the conductor layer 71, and the cover insulating layer 81 are located between the side surface 44 and the side surface 47 in the transverse direction Y. A sum of the thickness T48 of the second portion 48 and a thickness T50 of a wiring portion 50 is, for example, smaller than or equal to the thickness T41 of the pair of first portions 41A and 41B.

In the example shown in FIG. 18, a sum of the thickness T48 of the second portion 48 and the thickness T50 of the wiring portion 50 is smaller than the thickness T41 of the pair of first portions 41A and 41B. For this reason, the wiring portion 50 does not project more than the surfaces 42 and 45 in the thickness direction Z.

In the configuration of the flexure 30 of the eleventh embodiment, too, the same effects as those in each of the above-described embodiments can be obtained. In the flexure 30 of the eleventh embodiment, increase in the thickness of the flexure 30 can be suppressed since the wiring portion 50 is located between the side surface 44 and the side surface 47. Furthermore, the rigidity of the flexure 30 in the transverse direction Y can be further increased by forming the second portion 48 connected to the pair of first portions 41A and 41B.

Twelfth Embodiment

Figure 19:
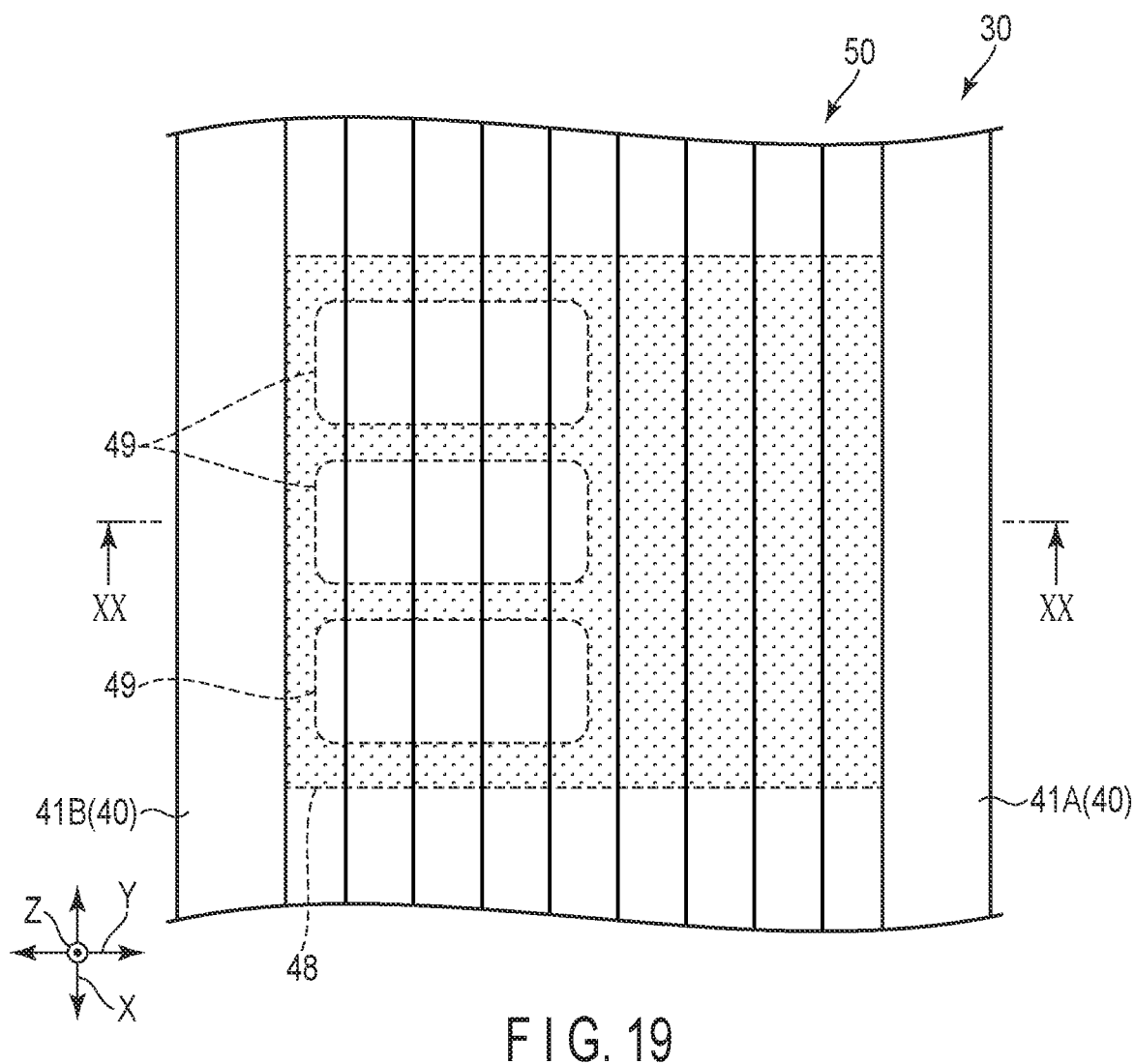
FIG. 19 is a schematic partial plan view showing a flexure according to a twelfth embodiment.
Figure 20:
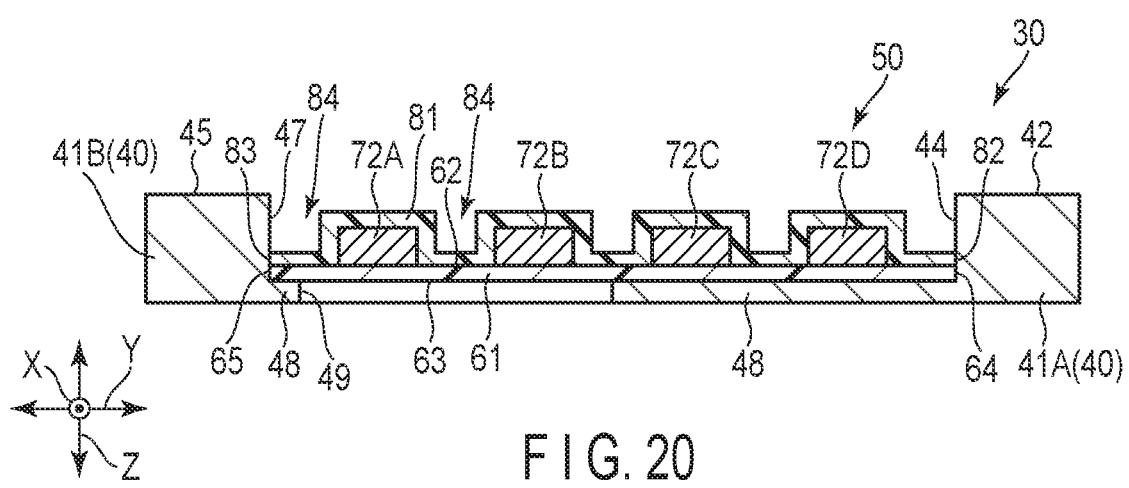
FIG. 20 is a schematic cross-sectional view showing a flexure taken along line XX-XX of FIG. 19.

FIG. 19 is a schematic partial plan view showing a flexure 30 according to a twelfth embodiment. FIG. 20 is a schematic cross-sectional view showing the flexure 30 taken along line XX-XX of FIG. 19. The flexure 30 of the twelfth embodiment is different from the eleventh embodiment in that a second portion 48 includes an opening 49.

As shown in FIG. 19 and FIG. 20, the second portion 48 of a metal base 40 includes the opening 49. The opening 49 overlaps with a conductor layer 71 in the thickness direction Z. In a plurality of lines 72A to 72D, the lines 72A and 72B overlap with the opening 49, and the lines 72C and 72D do net overlap with the opening 49.

In the example shown in FIG. 19, three openings 49 are formed along the longitudinal direction X. The number of openings 49 may be two or less, or four or more. Two or more openings 49 may be formed in the width direction of the wiring portion 50 (transverse direction Y in the example shown in FIG. 19 and FIG. 20). The size of the openings 49 may be changed arbitrarily. The number and range of lines overlapping with the opening 49 can be changed arbitrarily by changing the size of openings 49.

In the configuration of the flexure 30 of the twelfth embodiment, the same effects as those in each of the above-described embodiments can be obtained. In the flexure 30 of the twelfth embodiment, adjustment of the electrical characteristics of the flexure 30 and the like can be executed by forming the openings 49 in the second portion 48.

Thirteenth Embodiment

Figure 21:
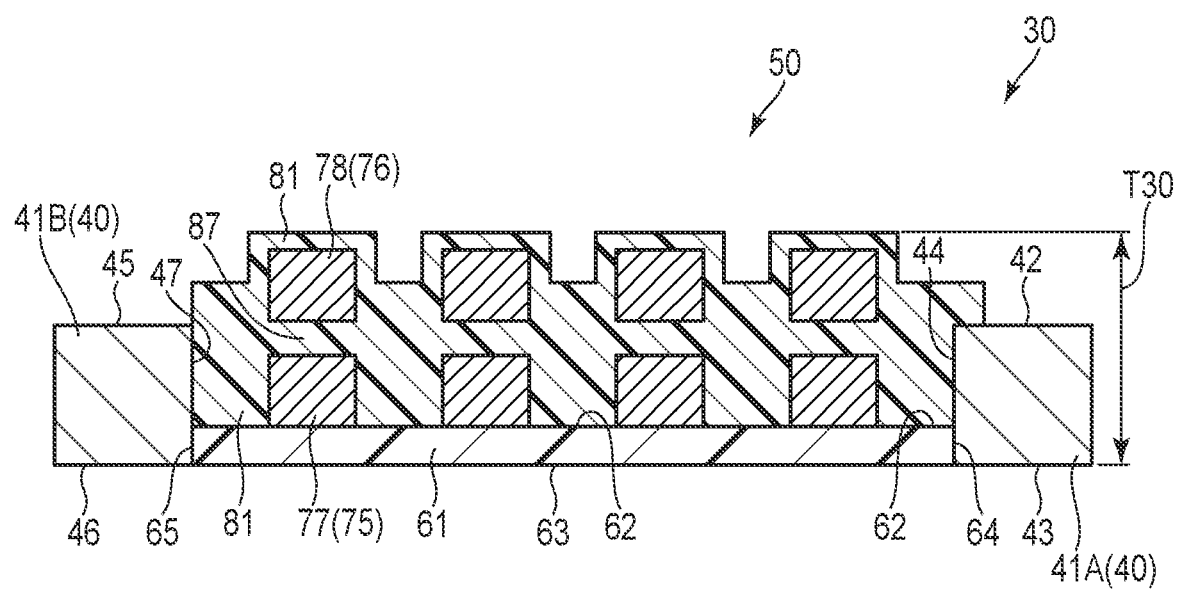
FIG. 21 is a schematic cross-sectional view showing a flexure according to a thirteenth embodiment.

FIG. 21 is a schematic cross-sectional view showing a flexure 30 according to a thirteenth embodiment. The flexure 30 of the thirteenth embodiment is different from each of the above-described embodiments in comprising a plurality of conductor layers.

As shown in FIG. 21, a wiring portion 50 includes a base insulating layer 61, a plurality of conductor layers, and a cover insulating layer 81. The plurality of conductor layers include a first conductor layer 75 and a second conductor layer 76 that overlaps with the first conductor layer 75. The first conductor layer 75 and the second conductor layer 76 include a plurality of lines 77 and 78, respectively.

The first conductor layer 75 is in contact with a surface 62 of the base insulating layer 61. The first conductor layer 75 is located between the side surface 44 and the side surface 47 in the transverse direction Y. The plurality of lines 78 are provided to overlap with the plurality of lines 77, respectively.

A portion 87 of the cover insulation layer 81 is provided between the first conductor layer 75 and the second conductor layer 76. The first conductor layer 75 and the second conductor layer 76 are insulated by a cover insulating layer 81. A surrounding of the second conductor layer 76 is covered with the cover insulating layer 81.

In the configuration of the flexure 30 of the thirteenth embodiment, too, the same effects as those in the above-mentioned embodiments can be obtained. In the flexure 30 of the thirteenth embodiment, since the first conductor layer 75 is provided between the side surface 44 and the side surface 47 even in a case where a plurality of conductor layers are provided, increase in a thickness T30 of the flexure 30 can be suppressed and the flexure 30 can be made thinner.

The thickness of the first conductor layer 75 may be equal to or different from the thickness of the second conductor layer 76. The number of conductor layers is not limited to two, but may be three or more. Providing a plurality of conductor layers, similarly to the flexure 30 of the thirteenth embodiment can be applied to each of the above-described embodiments.

In implementing the inventions disclosed in the above embodiments, not only the specific configurations of the shape of the load beam and the flexure, but also the specific configurations of each element that constitutes the disk drive suspension can be changed variously.

The plurality of lines 72 may have different thicknesses. The grooves 66 described with reference to the third and fourth embodiments can also be arbitrarily applied to the base insulating layer 61 described in the fifth and subsequent embodiments. The air layer 91 described with reference to the sixth embodiment can also be arbitrarily applied to the other embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A flexure of a disk drive suspension comprising:
a metal base; and
a wiring portion provided along the metal base,
the wiring portion including a base insulating layer, a conductor layer overlapping with the base insulating layer, and a cover insulating layer overlapping with the conductor layer,
the metal base including a pair of first portions having side surfaces opposed to each other,
at least one of the base insulating layer and the cover insulating layer being in contact with the side surfaces between the pair of first portions,
the conductor layer not overlapping with the metal base in a direction of stacking the wiring portion.

2. The flexure of claim 1, wherein
the base insulating layer, the conductor layer, and the cover insulating layer are located between the side surfaces, and
a thickness of the wiring portion is smaller than or equal to a thickness of the pair of first portions.

3. The flexure of claim 1, wherein
at least a part of the conductor layer is buried in the base insulating layer.

4. The flexure of claim 1, wherein
the base insulating layer is located between the side surfaces, and
the conductor layer and the cover insulating layer are not located between the side surfaces.

5. The flexure of claim 1, further comprising an air layer, wherein
the base insulating layer is in contact with the air layer between the side surfaces.

6. The flexure of claim 1, further comprising:
a support layer supporting the wiring portion,
wherein
the base insulating layer includes a first surface with which the conductor layer is in contact and a second surface opposite to the first surface in the direction of stacking, and
the support layer is in contact with the second surface.

7. The flexure of claim 1, further comprising:
a connection portion, wherein
the conductor layer includes a plurality of lines arranged in a direction orthogonal to a direction of extension of the wiring portion, and
the connection portion is electrically connected to at least one of the plurality of lines.

8. A disk drive suspension comprising:
a load beam; and
the flexure of claim 1 overlapping with the load beam.

* * * * *